(12) United States Patent
Mikkelsen et al.

(10) Patent No.: US 6,614,582 B1
(45) Date of Patent: Sep. 2, 2003

(54) OPTICAL REGENERATION AND WAVELENGTH CONVERSION USING SEMICONDUCTOR OPTICAL AMPLIFIER BASED INTERFEROMETERS

(75) Inventors: Benny Peter Mikkelsen, Atlantic Highlands, NJ (US); Gregory Raybon, Shrewsbury, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/499,132

(22) Filed: Feb. 7, 2000

(51) Int. Cl.$^7$ .................................................. G02F 1/35
(52) U.S. Cl. ........................ 359/326; 398/155; 398/175
(58) Field of Search ............................... 359/158, 176, 359/326; 356/345

(56) References Cited

U.S. PATENT DOCUMENTS 5,978,129 A  *  11/1999  Jourdan et al. ............. 359/326
6,208,454 B1 *   3/2001  Koren et al. ................ 359/326

OTHER PUBLICATIONS

L. H. Spiekman, J. M. Wiesenfeld, U. Koren, B.I. Miller and M. D. Chien; All–Optical Mach–Zehnder Wavelength Converter with Monolithically Integrated Preamplifiers; IEEE Photonics Technology Letters, vol. 10, No. 8, 8/98.

B. Mikkelsen, K.S. Jepsen, M. Vaa, H. N. Poulsen, K. E. Stubkjaer, R. Hess, M. Duelk, W. Vogt, E. Gamper, E. Gini, P. A. Besse, H. Melchior, S. Bouchoule and F. Devaux; All–Optical Wavelength Converter Scheme for High Speed RZ Signal Formats; Electronic Letters; vol. 33, No. 25, Dec. 4, 1997.

* cited by examiner

Primary Examiner—Kinfe-Michael Negash
(74) Attorney, Agent, or Firm—David A. Sasso

(57) ABSTRACT

An optical translator that includes an interferometer and a plurality of semiconductor optical amplifiers (SOAs) coupled to the interferometer. The at least two of the SOAs receives data and a clock signal. The data is received by the at least two SOAs at different times. A coupler combines each of a respective output of the at least two SOAs to provide output data. The output data is a retimed and a reshaped signal of the data provided to at least one of the plurality of SOAs.

19 Claims, 5 Drawing Sheets

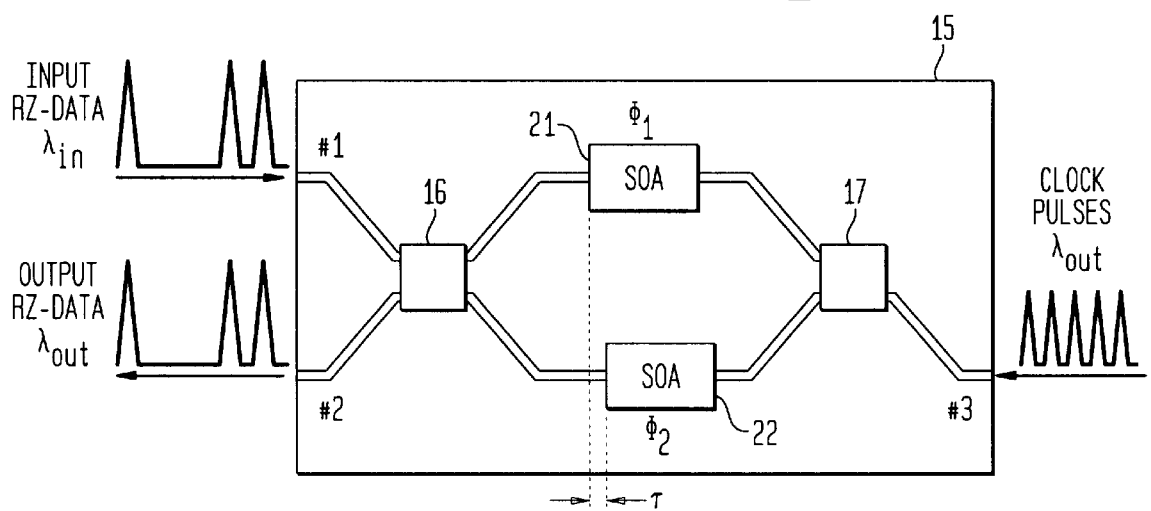
FIG. 1A
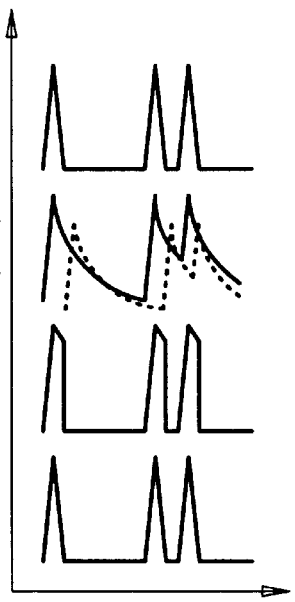
FIG. 1B  INPUT DATA
FIG. 1C  $\Phi_1$ —  $\Phi_2$ ······
FIG. 1D  $Cos(\Phi_1-\Phi_2)$
FIG. 1E  OUTPUT DATA 10 Gbit/s 20 Gbit/s 20 ps/div

OPTICAL REGENERATION AND WAVELENGTH CONVERSION USING SEMICONDUCTOR OPTICAL AMPLIFIER BASED INTERFEROMETERS

FIELD OF THE INVENTION

The present invention relates to optical regeneration and wavelength conversion systems and methods.

BACKGROUND INFORMATION

Optical translators that can perform wavelength conversion, power equalization and signal reshaping are important elements for an optical network layer. The wavelength converter function is needed to perform wavelength adaptation between different vendors and to decrease wavelength blocking. The regenerative feature is important since the analog nature of wavelength division multiplex (WDM) systems with erbium doped fiber amplifiers(EDFAs) will suffer from fast accumulation of amplified spontaneous emission (ASE), non-flat EDFA gain, fiber non-linearities, dispersion and various types of cross talk.

Currently, optical translation is performed by optoelectronic regenerators. Optoelectronic regenerators, however, have several disadvantages including high cost, restricted bit rate operation and high power consumption. Further, wavelength conversion of 40 Gbit/s return-to-zero (RZ) signals has previously been demonstrated with a monolithically integrated SOA MZ Interferometer. See B. Mikkelsen, et al., "All-Optical Wavelength Converter Scheme for High Speed RZ Signal Formats," Electron. Lett., vol. 33, no. 25, pp. 2137–2139, 1997, incorporate herein by reference in its entirety. The conversion described therein, however, did not include re-amplification, re-shaping and re-timing (3R) regeneration.

SUMMARY OF THE INVENTION

The present invention is directed to an all-optical translator capable of performing re-amplification, re-shaping and re-timing (P3R regeneration) and wavelength conversion of a very high speed optical return-to-zero (RZ) signal (10 to 100 Gbit/s). Measurements of the performance relative to delay variation indicate that the regenerator is able to perform very efficient re-timing.

An aspect of the present invention provides an optical translator that includes an interferometer and a plurality of semiconductor optical amplifiers (SOAs) coupled to the interferometer. At least two of the SOAs receives data and a clock signal. The data is received by the at least two SOAs at different times. A coupler combines each of a respective output of the at least two SOAs to provide output data. The output data is a retimed and a reshaped signal of the data provided to at least one of the plurality of SOAs.

Another aspect of the present invention includes an optical translator including an interferometer and a plurality of semiconductor optical amplifiers (SOAs) coupled to the interferometer. At least two of the SOAs receives data at different times. The optical translator also includes a circulator that receives a clock signal and a coupler coupled to the circulator. The coupler combines each of a respective output of the at least two SOAs. The output data is provided by the circulator, the output data being a retimed and a reshaped signal of the data provided to at least one of the plurality of SOAs.

BRIEF DESCRIPTION OF THE DRAWINGS

FIGS. 1A through 1E show a block diagram and associated signals of an exemplary embodiment of an optical translator in accordance with the present invention.

DETAILED DESCRIPTION

FIG. 1A shows a block diagram of an exemplary embodiment of an optical translator 10 in accordance with the present invention. The optical translator 10 of FIG. 1A includes two semiconductor optical amplifiers (SOAs) 21, 22 integrated into an interferometer 15 such as an asymmetric Mach-Zehnder (MZ) interferometer. The interferometer 15, for example, includes at least three ports, labeled #1 through #3. The two SOAs 21 and 22 are displaced by an optical delay $\tau$, which is a fraction of the bit-period T (e.g., $0.1T<\tau<T$). Input data such as an RZ-data signal that is to be regenerated and wavelength converted is provided to port #1, for example, as shown in FIG. 1B. A clock signal such as a clocked pulse stream at a new wavelength ($\lambda_{out}$) is provided to port #3. The clock signal may, for example, be provided to each of at least two SOAs, 21, 22 by a splitter 17 coupled thereto. In an exemplary embodiment of the present invention, an optical clock rate can be recovered from the input data using a separate optical clock recovery (not shown).

The input data at port #1 is input to coupler 16, the coupler 16 splits, for example, the RZ-data signal equally between the two arms, e.g. optical paths, of the interferometer 15 and depletes carriers in each of the SOAs 21, 22, almost instantly. After the RZ-data signal has passed the SOAs 21, 22, the carriers recover. The refractive index of an SOA follows (inversely) the carrier concentration, hence a phase change ($\phi$) is introduced by the RZ-data signal in each arm of the interferometer. Due to the relative delay between the input data arriving at the SOAs 21, 22, the phase change produced in the SOAs 21, 22 are offset as shown in FIG. 1C. Accordingly, the slow recovery of the carriers will be canceled and as a result, an almost squared gating window/transfer function will be observed by the clock signal as it propagates from port #3 to port #2, for example, as shown in FIG. 1D. Thus, at output port #2, output data, for example, as shown in FIG. 1E being a retimed, reshaped and wavelength converted data signal of the input data as shown in FIG. 1B emerges. In an exemplary embodiment of the present invention, re-amplification may be performed by an additional EDFA or SOA in order to obtain 3R generation.

By allowing the input data to arrive at the first SOA at a different time than the input data arrives at the second SOA, the interferometer 15 is capable of rapidly switching between an open state and a closed state. In the open state, the interferometer 15 allows the clock signals to be passed. In the closed state, the interferometer 15 does not allow the clock signals to be passed. Accordingly, signals can be processed by the optical translator of the present invention at very high speeds, for example, such as 10 to 100 Gbits/s.

Figure 2:
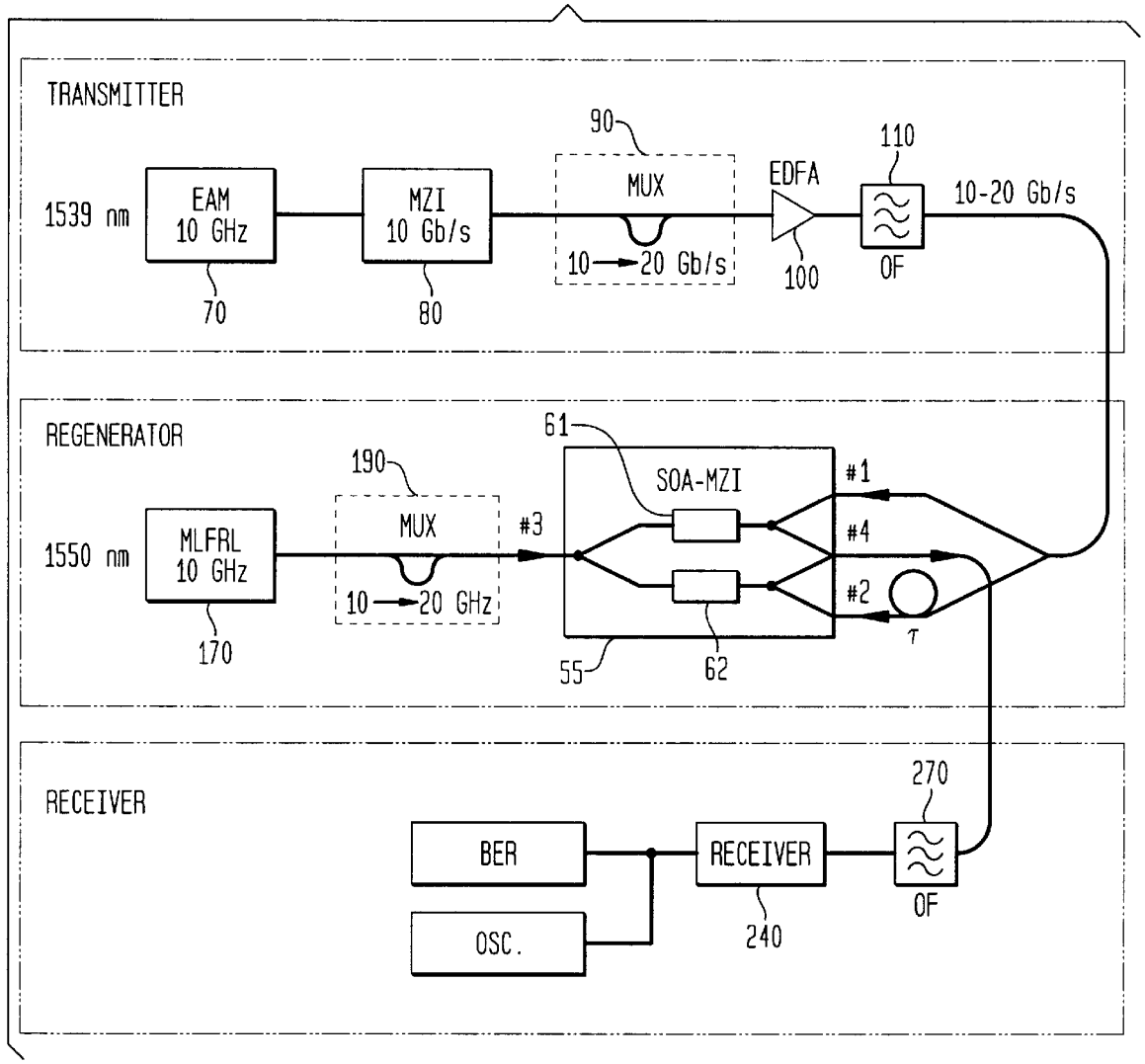
FIG. 2 shows a block diagram of an exemplary arrangement for demonstrating the performance of a symmetric MZ regenerator in accordance with the present invention.

FIG. 2 shows an experimental arrangement for demonstrating the operation of an exemplary MZ interferometer configuration in accordance with the present invention. In the configuration 50 shown in FIG. 2, two SOAs 61 and 62 are arranged symmetrically in an MZ interferometer 55. An electro-absorption modulator (EAM) 70 generates pulses that are approximately 11 ps wide. 10 Gbit/s data is encoded onto the pulses by $LiNbO_3$ external modulator 80. An optical delay-line is used as an optical MUX 90 from 10 to 20 Gbit/s. The EDFA optically amplifies the data signal. The optical filter (OF) 110 filters EDFA noise.

The RZ input data pulse stream is split and applied to two ports (#1 and #2) of the interferometer 55, with one path delayed externally (by τ) before being coupled to the interferometer 55. A mode locked fiber ring laser (MLFRL) 170 operating at 10 GHz generates 5 ps pulses which are used as the clock pulses in connection with the regenerator 50. An optical MUX 190 generates a 20 GHz pulse train which is coupled to a port (#3) of the interferometer 55. The regenerated RZ signals emerge from port #4 of the interferometer.

Figure 3A:
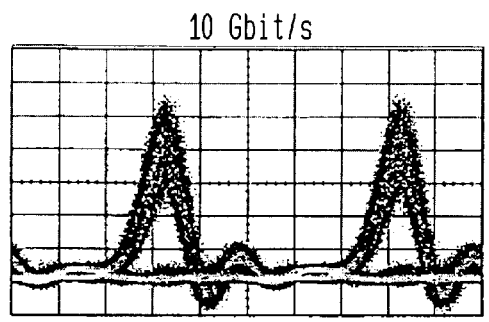
FIGS. 3A and 3B show eye-diagrams of regenerated RZ-signals at 10 and 20 Gbits/sec, respectively.
Figure 3B:
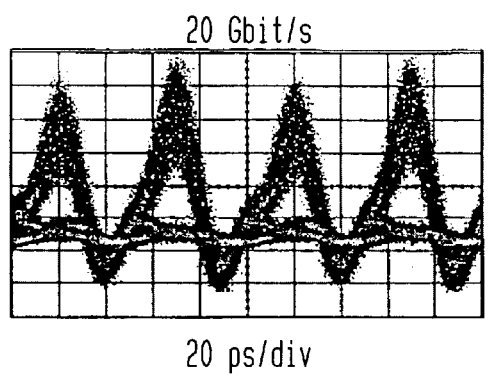

FIGS. 3A and 3B show measured eye diagrams for regenerated 10 and 20 Gbit/s RZ signals, respectively, using the arrangement of FIG. 2. The eye diagram depicted in 3A illustrates the 10 Gbit/s RZ signal measured at receiver 240. The eye diagram depicted in 3B illustrates the 20 Gbit/s RZ signal measured at receiver 240. The difference in amplitude between alternate eyes at 20 Gbit/s is due to the optical MUX 190 and not the regenerator 50.

Figure 4:
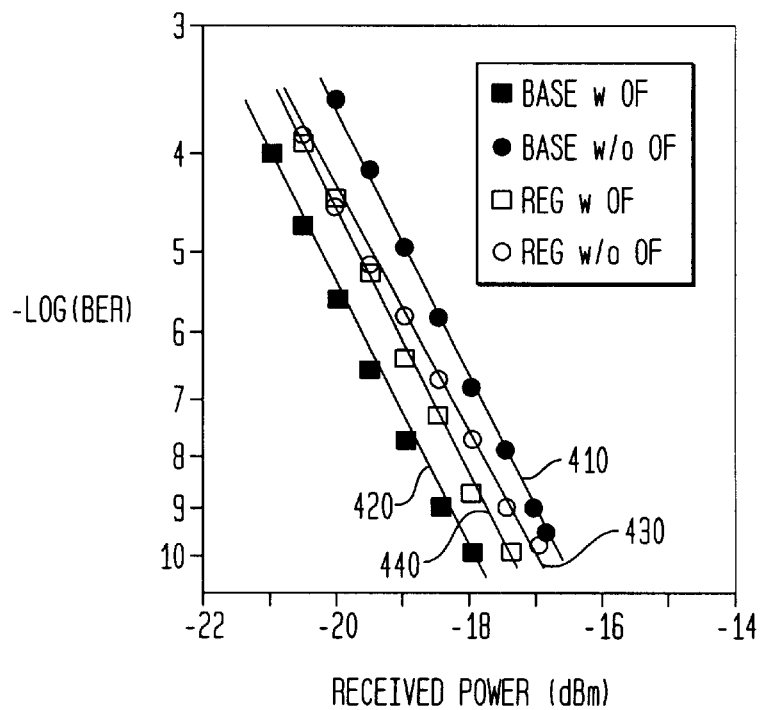
FIG. 4 shows plots of bit error rates for base line, after regeneration, with or without optical filtering.

FIG. 4 shows bit error rates (BER) at 10 Gbit/s. Two different base lines have been measured: square symbols include an optical filter before the receiver whereas other symbols are measured without any optical filters 110, 270. The open squares and circles are measured after the regenerator and correspond to the two cases with and without the filter 110 respectively. As seen, the regenerator degrades the BER performance marginally (<0.5 dB) compared to the baseline but it improves the BER performance for the case without the optical filter.

Figure 5:
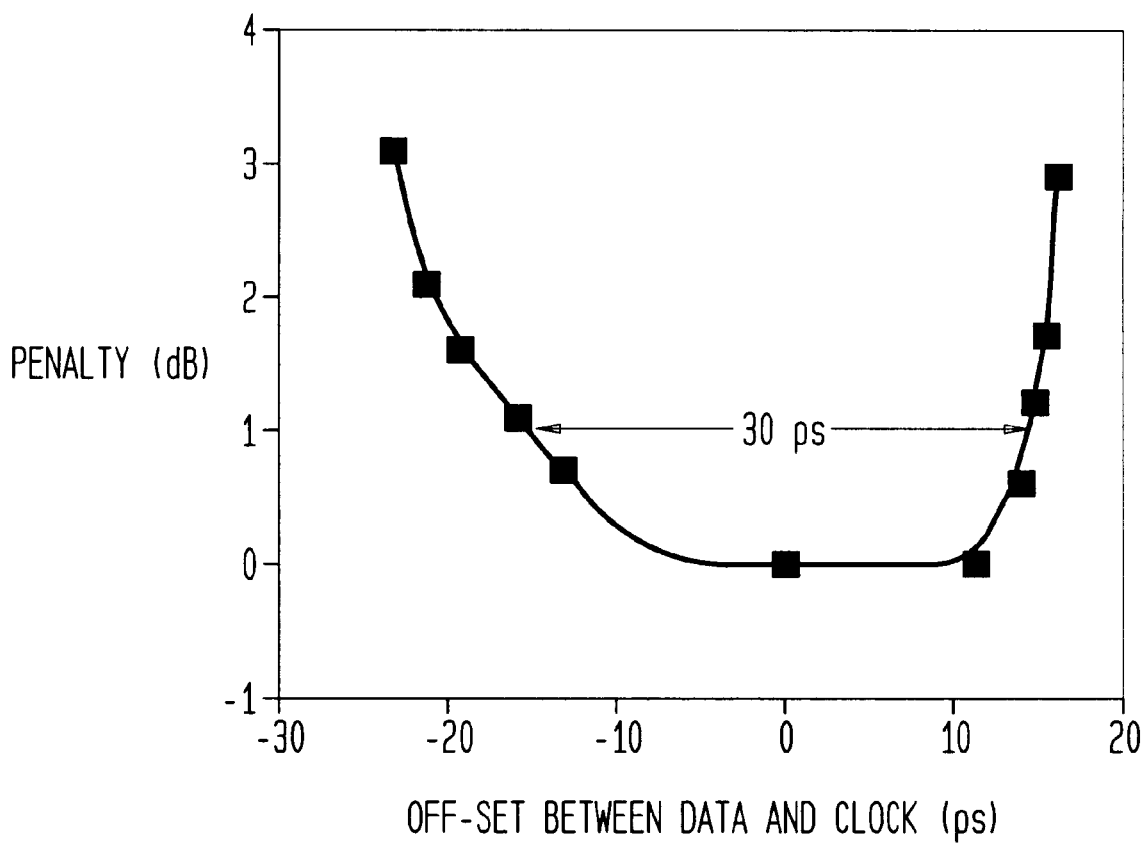
FIG. 5 shows a plot of system penalty as a function of the delay between data and clock pulses applied to an exemplary regenerator in accordance with the present invention.

The re-timing capability of the regenerator at 10 Gbit/s has been investigated by the following experiment: the system penalty @ $10^{-9}$ has been measured as a function of the relative delay between the input data and the clock pulses. The delay is varied by an electrical phase delay and the results are plotted in FIG. 5. As seen, for less than 1 dB of penalty the regenerator can tolerate a delay variation of up to 30 ps corresponding to 30% of the time slot. Hence it is expected that the regenerator is cable of performing very efficient re-timing.

Figure 6:
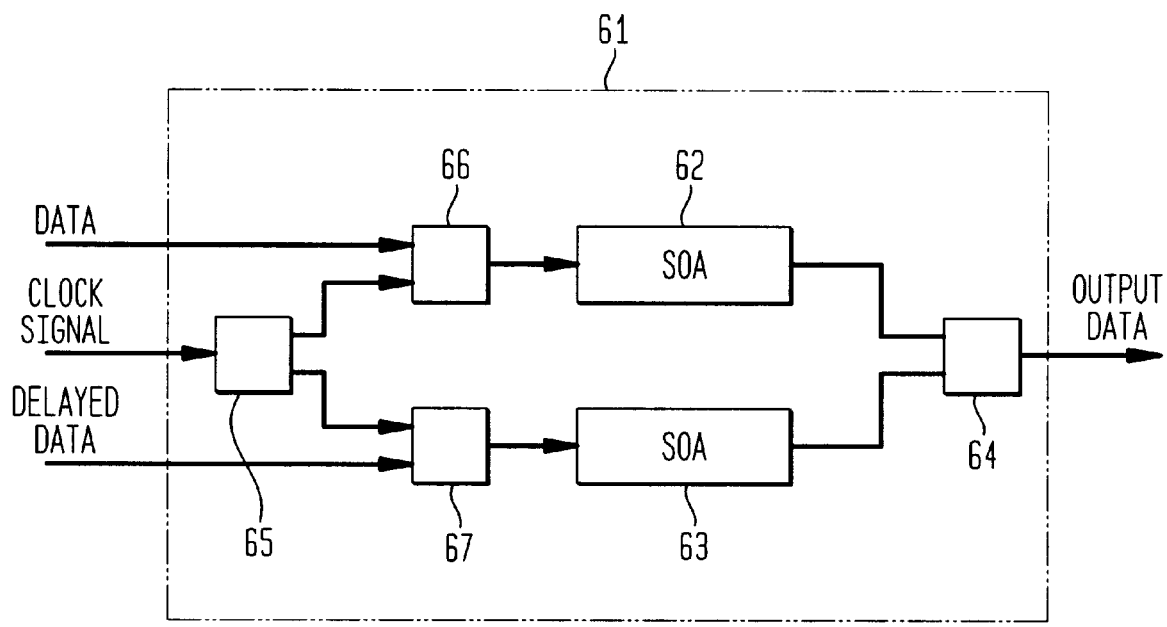
FIG. 6 shows a block diagram of an exemplary embodiment of an optical translator in accordance with the present invention.

FIG. 6 shows a block diagram of an exemplary embodiment of an optical translator in accordance with the present invention. The optical translator including an interferometer 61 and a plurality of SOAs 62, 63 coupled to the interferometer 61. The SOAS 62, 63 may be, for example, asymmetrically coupled with the interferometer 61, monolithically integrated with the interferometer 61 or hybrid integrated with the interferometer 61. In an exemplary embodiment of the present invention, the interferometer 61 may be a Michelson interferometer or a Mach Zehnder interferometer. Further, the interferometer 61 may be planar silica.

As shown in FIG. 6, at least two SOAs receives input data and a clock signal. The clock signal may be provided to the at least two SOAs 62, 63 by differential control, for example, by a splitter 65 coupled to the at least two SOAs 62, 63. The optical translator may also include a second coupler 66 and a third coupler 67 that provide input data and the clock signal to at least two SOAs 62, 63 respectively. The input signal provided by the third coupler 67, for example, may be delayed in relation to the input data being provided by the second coupler 66. In an exemplary embodiment of the present invention, a delay mechanism may be coupled to one of the SOAs 62, 63. Accordingly, the input data is received by the at least two SOAs 62, 63 at different times. The delay between each of the SOAs 62, 63 receiving the input data enables the interferometer 61 to be switched between an open state and a closed state. Such switching allows signals such as regeneration of the input data to be processed at very high speeds.

As shown in FIG. 6, the optical translator may also include a first coupler 64 that combines each of a respective output of the at least two SOAs 62, 63 to provide output data. The output data is a retimed and a reshaped signal of the input data provided to at least one of the plurality of SOAs 62, 63. The splitter 65, first coupler 64, second coupler 66 and third coupler 67, for example, may be one of a directional coupler, a power splitter and a multi-mode interference based coupler. The optical translator may also include a clock recovery circuit for obtaining a clock rate and providing the clock signal to the SOAs 62, 63.

Figure 7:
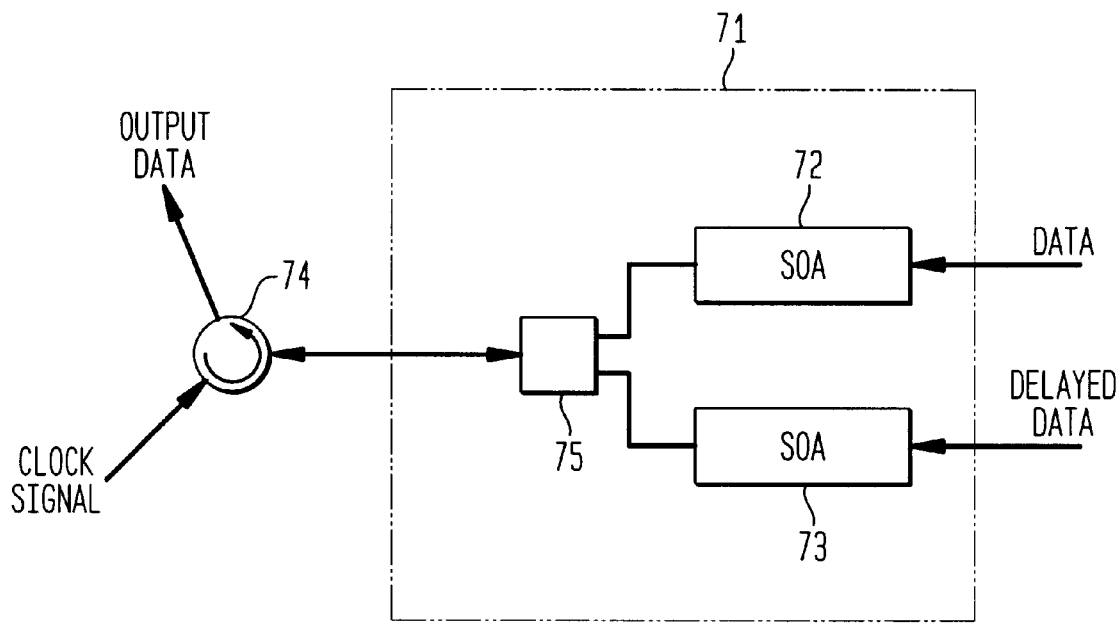
FIG. 7 shows a block diagram of another exemplary embodiment of an optical translator in accordance with the present invention.

FIG. 7 shows a block diagram of another exemplary embodiment of an optical translator in accordance with the present invention. The optical translator 71 includes an interferometer 71 and a plurality of SOAs 72, 73 coupled to the interferometer 71. At least two of the SOAs 72, 73 receive data at different times. The optical translator may include a circulator 74 that receives a clock signal and a coupler 75 coupled to the circulator 74. In an exemplary embodiment of the present invention, the coupler 75 provides the clock signal to each of the at least two SOAs 72, 73. The coupler 75 also combines each of a respective output of the at least two SOAs 72, 73. Output data is provided by the circulator 74. The output data is a retimed and a reshaped signal of the input data provided to at least one of the plurality of SOAs 72, 73.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. An optical translator comprising:

an interferometer;

a plurality of semiconductor optical amplifiers (SOAs) coupled to the interferometer;

at least two of the SOAs receiving data and a clock signal, wherein the data is received by the at least two SOAs at different times;

a coupler combining each of a respective output of the at least two SOAs to provide output data;

wherein the output data is a retimed and a reshaped signal of the data provided to at least one of the plurality of SOAs.

2. The optical translator according to claim 1, further including a splitter coupled to the at least two SOAs, wherein the splitter provides the clock signal to the at least two SOAs.

3. The optical translator according to claim 2, wherein the splitter is one of a directional coupler, a power splitter and a multi-mode interference based coupler.

4. The optical translator according to claim 1, further including a clock recovery circuit for obtaining a clock rate and providing the clock signal.

5. The optical translator according to claim 1, wherein the interferometer is one of a Michelson interferometer and a Mach Zehnder interferometer.

6. The optical translator according to claim 1, wherein the plurality of SOAs is two.

7. The optical translator according to claim 1, wherein differential control is applied to the at least two SOAs by at least one clock signal.

8. The optical translator according to claim 1, wherein the plurality of SOAs are at least one of asymmetrically coupled with the interferometer, monolithically integrated with the interferometer and hybrid integrated with the interferometer.

9. The optical translator according to claim 1, wherein the interferometer is planar silica.

10. The optical translator according to claim 1, wherein the coupler is one of a directional coupler, a power splitter and a multi-mode interference based coupler.

11. An optical translator comprising:

an interferometer;

a plurality of semiconductor optical amplifiers (SOAs) coupled to the interferometer;

at least two of the SOAs receiving data at different times;

a circulator receiving a clock signal; and a coupler coupled to the circulator, the coupler combining each of a respective output of the at least two SOAs;

wherein output data is provided by the circulator, the output data being a retimed and a reshaped signal of the data provided to at least one of the plurality of SOAs.

12. The optical translator according to claim 11, wherein the coupler provides the clock signal to each of the at least two SOAs.

13. The optical translator according to claim 11, further including a clock recovery circuit for obtaining a clock rate and providing the clock signal.

14. The optical translator according to claim 11, wherein the interferometer is one of a Michelson interferometer and a Mach Zehnder interferometer.

15. The optical translator according to claim 11, wherein the plurality of SOAs is two.

16. The optical translator according to claim 11, wherein differential control is applied to the at least two SOAs by at least one clock signal.

17. The optical translator according to claim 11, wherein the plurality of SOAs are at least one of asymmetrically coupled with the interferometer, monolithically integrated with the interferometer and hybrid integrated with the interferometer.

18. The optical translator according to claim 11, wherein the interferometer is planar silica.

19. The optical translator according to claim 11, wherein the coupler is one of a directional coupler, a power splitter and a multi-mode interference based coupler.

* * * * *